April 30, 1935.  C. SAUZEDDE  1,999,211
DOUBLE OPPOSED COMPRESSOR
Filed May 2, 1932
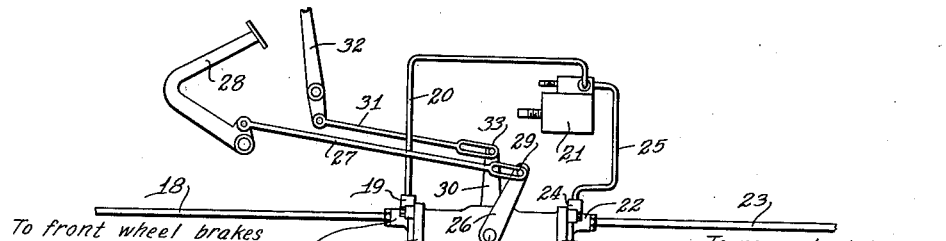
Fig. 1.
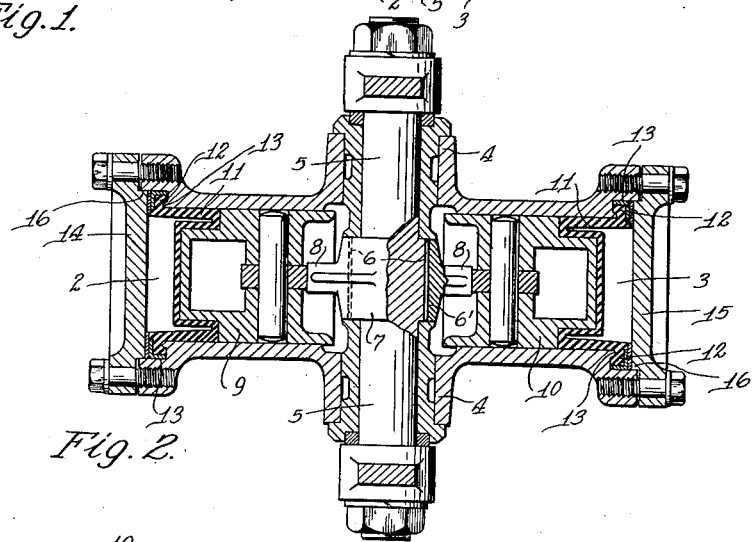
Fig. 2.
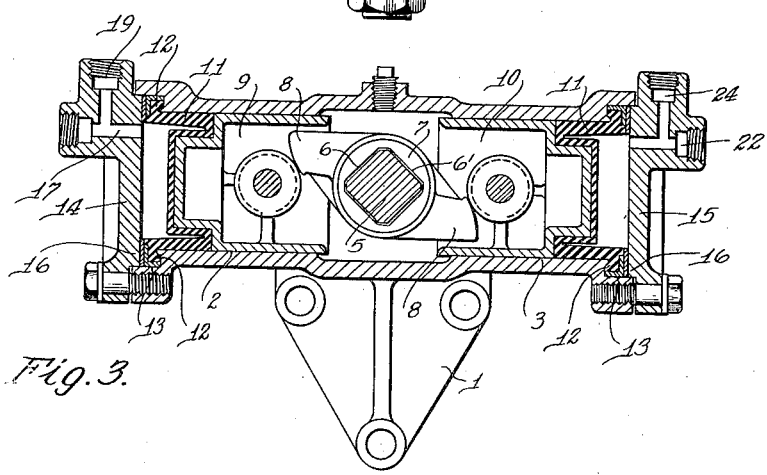
Fig. 3.
INVENTOR
Claude Sauzedde
BY
ATTORNEYS Patented Apr. 30, 1935

1,999,211

UNITED STATES PATENT OFFICE 1,999,211

DOUBLE OPPOSED COMPRESSOR

Claude Sauzedde, Detroit, Mich., assignor to Detroit Hydrostatic Brake Corporation, Detroit, Mich., a corporation of Michigan Application May 2, 1932, Serial No. 608,660

4 Claims. (Cl. 60—54.6)

The present invention relates to a novel fluid compressor of a type particularly adapted for use on automobiles and aircraft having brakes operated by fluid pressure.

The primary object of the present invention is to provide a double acting fluid compressor for hydrostatic braking systems with a pair of opposed compression cylinders arranged in co-axial alignment and containing slidable pistons in a manner whereby a single means may be interposed between the cylinders and operated either by hand or foot lever or any other means to cause movement of the pistons in both of said cylinders simultaneously. In this manner fluid contained in the cylinders is forced therefrom by the movement of the pistons into the lines connecting the two cylinders to the brakes on the front wheels and the brakes on the rear wheels, or in the case of aircraft to the left and right wheels. The single means is in the form of a cam mounted on a shaft that is connected to both the hand operated brake lever and the foot operated brake pedal so that movement of either rotates the shaft and cam so that the latter forces the pistons apart and compresses the fluid in the lines.

Another object of the present invention is to provide a double fluid compressor for hydrostatic braking systems on automotive vehicles and aircraft which is adapted to independently compress the liquid in the lines leading to the brakes on the front wheels and the brakes on the rear wheels in a manner whereby failure in operation of the brakes on one set of wheels, as a result of an accidentally broken line, causes the pressure from the manually operated lever and pedal which would ordinarily be distributed to both sets of brakes to be applied to the remaining set of brakes and thereby cause an increase in the braking action thereof so that effective braking may be had regardless of the failure of one set of brakes in functioning.

With the above and other ends in view the invention consists in matters hereinafter set forth and more particularly pointed out in the appended claims, reference being had to the accompanying drawing, in which Figure 1 is a fragmentary diagrammatic view illustrating the present fluid compressor in a hydrostatic braking system;

Fig. 2 is a cross sectional view taken substantially along the horizontal center line of the fluid compressor and looking down, and Fig. 3 is a cross sectional view taken substantially along the vertical center line of the compressor.

Like characters of reference are employed throughout to designate corresponding parts.

The present fluid compressor may be formed of a casing having an integral bracket 1 by means of which it may be conveniently bolted to an automobile or aircraft, the casing being formed with a pair of spaced apart cylinders 2 and 3 which are co-axially aligned. In the portion of the casting that forms webs to join the two cylinders are formed bearing bosses in which the shaft 5 is rotatably journalled. The shaft 5 has a squared or otherwise angular portion 6 intermediate its ends and an eccentric or cam member 7 is provided with a similarly shaped opening 6' which permits said member 7 to be slipped onto said shaft in a manner to key it thereto. The opening 6' is formed to provide a clearance between the angular portion 6 and the member 7 so that the latter may rotate a small amount thereon. The cam member 7 is preferably formed with outwardly projecting cam fingers 8 whose cam surfaces are diametrically opposite each other.

Slidingly received in the cylinders 2 and 3 respectively are stepped head pistons 9 and 10 and flexible, double cupped seals 11 are provided in each cylinder and so arranged that the stepped end of each piston is received in a seal. The seals are provided with a peripheral flange 12 that projects into the recess 13 that is formed at the outer end of each cylinder 2 and 3. End closure caps 14 and 15 are bolted to the outer ends of the cylinders 2 and 3 respectively and each closure cap is provided with a concentric projection 16 that projects into the recess 13. When the closure caps are bolted in place the peripheral flanges 12 are tightly interposed between the bottoms of the recesses 13 and the projecting portions 16 on the closure caps.

The closure cap 14 is provided with a port 17 that is connected by a pipe line 18 to fluid operated brakes on the front wheels of a vehicle. It is also provided with a port 19 that is connected by a pipe line 20 to a fluid compensator 21 which serves as a reservoir for fluid by means of which the cylinder 2 and line 18 may be kept full of fluid. The closure cap 15 is provided with a port 22 that is connected by a pipe line 23 to fluid operated brakes on rear wheels of a vehicle. The cap 15 is also provided with a port 24 that is connected by a pipe line 25 to the fluid compensator 21 by means of which the cylinder 3 and line 23 are maintained full of fluid.

Non-rotatably mounted on one of the outer ends of the shaft 5 is a lever 26 that is connected by a link 27 to a foot pedal 28 so that depression of said pedal as a result of manual pressure exerted thereon causes the shaft 5 to be rotated. The link 27 is connected to the lever 26 by a slot and pin 29 that permits said lever to move forward under certain circumstances without causing movement of the link. On the opposite end of the shaft 5 is mounted a lever 30 that is connected by a link 31 to a hand lever 32, the link being connected to the lever 30 by a slot and pin 33 so that the lever 30 may move forward freely.

In each piston there is mounted a roller 34 against which the cam fingers 8 bear and when it is desired to move the pistons in a manner to force the fluid from the cylinders 2 and 3 and into the lines 18 and 23 the shaft L is rotated in a counter clockwise direction and as the cam fingers 8 rotate therewith the pistons are forced outwardly. The shaft 5 may be rotated by depression of the brake pedal 28 which causes the link 27 to draw the lever 26 forward, the lever 30 being free to move relative to the link 31 because of the slot and pin connection 33. The shaft 5 may also be rotated by movement of the hand lever 32 which draws the link 31 and lever 30 forward, the lever 26 at that time being free to move relative to the link 27 because of the slot and pin connection 29.

In cases where variation in dimensions are incurred during the manufacture of the double compressor it is found that greater pressure is applied in one line than in the other, resulting from the fact that the cam moves one piston before it moves the other. The present device, however, in providing the clearance between the opening 6' and the angular portion 6 of the shaft 5 permits the cam to shift in cases where one piston is closer to it than the other and thereby insures equal and simultaneous movement of both pistons and equal pressure in the lines.

Although a specific embodiment of the present invention has been illustrated and described it is to be understood that various changes may be made in the details of construction without departing from the spirit of the invention as set forth in the appended claims, and such changes are contemplated.

What I claim is:

1. In hydrostatic braking systems subject to both pedal and hand lever control, wherein a pair of pressure lines individually control the pressure applications of brake units individual to the lines, and wherein the lines are rendered active concurrently to apply the brakes by individual activity of pedal or hand lever at will, said assembly including an actuating unit comprising a pair of opposed cylinders, each cylinder being operatively connected to a pressure line individual to the cylinder, a piston for and movable in each cylinder, said pistons being in opposing relation, a shaft between and having its axis normal to the piston axes, a cam formation carried by the shaft for shifting said pistons concurrently in directions to apply the brakes by shaft movement in one direction of rotation, and individual lost-motion connections between the shaft and the pedal and hand-lever respectively for providing shaft movements in such direction at will by either pedal or hand lever whereby similar braking activity may be provided by either power source individually with such activity by one power source rendering the shaft free from manipulation from the companion power source.

2. A unit as in claim 1 characterized in that the cylinders, pistons and shaft are housed by a casing with the shaft ends projecting to permit external location of the lost-motion connections at the opposite ends of the shaft.

3. A unit as in claim 1 characterized in that the shaft and cam formation have complemental configurations to communicate shaft movement to the cam formation, said configurations presenting a relatively loose fit between shaft and formation to enable compensation for variations in piston positions of the assembly.

4. A system as in claim 1 characterized in that the pistons, cylinders and cam formation are housed by a casing with the casing carrying the line connections, said casing also having individual connections between each cylinder and a fluid compensating means, whereby the line pressure is controllable with the the control made applicable within the unit.

CLAUDE SAUZEDDE.